(12) United States Patent
Ki et al.

(10) Patent No.: US 9,512,497 B2
(45) Date of Patent: Dec. 6, 2016

(54) METHOD FOR REDUCING SLAG

(71) Applicants: Hyundai Steel Company, Incheon (KR); Inha-Industry Partnership Institute, Incheon (KR)

(72) Inventors: Joon-Seong Ki, Incheon (KR); Dong-Kyung Shin, Incheon (KR); Byung-Don You, Incheon (KR); Seong-Woong Joo, Incheon (KR); Seong-Hun Hong, Incheon (KR); Jin-Ill Hwang, Incheon (KR)

(73) Assignees: Hyundai Steel Company, Incheon (KR); Inha-Industry Partnership Institute, Incheon (KR)

( * ) Notice: Subject to any disclaimer, the term of this patent is extended or adjusted under 35 U.S.C. 154(b) by 122 days.

(21) Appl. No.: 14/446,283

(22) Filed: Jul. 29, 2014

(65) Prior Publication Data
US 2014/0331820 A1 Nov. 13, 2014

Related U.S. Application Data

(63) Continuation of application No. PCT/KR2012/011827, filed on Dec. 31, 2012.

(30) Foreign Application Priority Data

Jan. 31, 2012 (KR) .................. 10-2012-0009773
Nov. 28, 2012 (KR) .................. 10-2012-0136365

(51) Int. Cl.
*C21C 7/00* (2006.01)
*C22B 7/04* (2006.01)
(Continued)

(52) U.S. Cl.
CPC .................. *C21B 15/00* (2013.01); *C04B 5/00* (2013.01); *C04B 5/06* (2013.01); *C21C 7/0087* (2013.01);
(Continued)

(58) Field of Classification Search
CPC ................ C04B 5/00; C04B 5/06; C22B 7/04; C21C 5/54
See application file for complete search history.

(56) References Cited

U.S. PATENT DOCUMENTS

2010/0089202 A1* 4/2010 Reichel .................. C21C 5/527 75/10.35
2012/0073406 A1* 3/2012 Ki ............................. C04B 5/06 75/414

FOREIGN PATENT DOCUMENTS

JP 06-235017 A 8/1994
JP 06-279828 A 10/1994
(Continued)

OTHER PUBLICATIONS

Fujimara et al. JP 2004-149823 A published May 2004. Machine translation of the description.*
(Continued)

*Primary Examiner* — George Wyszomierski
*Assistant Examiner* — Tima M McGuthry Banks
(74) *Attorney, Agent, or Firm* — Mintz Levin Cohn Ferris Glovsky and Popeo, P.C.; Kongsik Kim; Joohee Lee

(57) ABSTRACT

Disclosed herein is a method of reducing slag, including the steps of: examining the components of slag to be reduced, and setting a target composition ratio after reduction; determining the mixing ratio and input amount of a complex reducing agent of a plurality of reducing agents in accordance with the set target composition ratio to determine the complex reducing agent; and supplying the complex reducing agent into molten slag to reduce the slag. The method is advantageous in that the reduction efficiency of slag can be maximized, various kinds of reducing agents can be efficiently used, and the recovery amount of valuable metals can be increased, thus reducing cost.

6 Claims, 3 Drawing Sheets

(51) Int. Cl.
   *C21C 5/54*      (2006.01)
   *C04B 5/00*      (2006.01)
   *C04B 5/06*      (2006.01)
   *C21B 15/00*     (2006.01)
   C21C 5/36        (2006.01)

(52) U.S. Cl.
   CPC . *C22B 7/04* (2013.01); *C21C 5/36* (2013.01);
        *C21C 5/54* (2013.01); *Y02P 10/216* (2015.11)

(56) References Cited

FOREIGN PATENT DOCUMENTS

| | | | |
|---|---|---|---|
| JP | 07-252516 A | | 10/1995 |
| JP | 2001-342510 A | | 12/2001 |
| JP | 2004149823 A | * | 5/2004 |
| JP | 2008-163463 A | | 7/2008 |
| KR | 10-1999-0018912 A | | 3/1999 |
| KR | 10-0207859 B1 | | 7/1999 |
| KR | 10-0226942 B1 | | 7/1999 |
| KR | 10-0377273 B1 | | 6/2003 |
| KR | 10-0398400 B1 | | 9/2003 |
| KR | 10-0872906 B1 | | 12/2008 |
| KR | 10-2011-0077257 A | | 7/2011 |
| KR | 10-2011-0104695 A | | 9/2011 |
| WO | WO 2011081267 A1 | * | 7/2011 |

OTHER PUBLICATIONS

Derwent Acc No. 2011-H6900 for the patent family including WO 2011/081267 A1 published Jul. 2011 by Hwang et al. Abstract.*
Office Action issued on Aug. 28, 2015 in corresponding Japanese Patent Application No. 2014-552121.

* cited by examiner

METHOD FOR REDUCING SLAG

CROSS REFERENCE TO RELATED APPLICATION

This application is a continuation of International Application No. PCT/KR2012/011827, filed on Dec. 31, 2012, which claims priority to Korean Patent Application No. 10-2012-0009773, filed on Jan. 31, 2012 and Korean Patent Application No. 10-2012-0136365, filed on Nov. 28, 2012, which applications are hereby incorporated by reference in their entirety into this application.

BACKGROUND

1. Technical Field

The present invention relates to a method of reducing slag, and, more particularly, to a method of reducing slag, by which the reduction effect of slag can be improved by supplying an optimal reducing agent into slag generated from an iron-making or steel-making process.

This application claims the benefits of Korean Patent Application No. 10-2012-0009773, filed on Jan. 31, 2012, and Korean Patent Application No. 10-2012-0136365, filed on Nov. 28, 2012, which are hereby incorporated by reference in its entirety into this application.

2. Related Art

Generally, slag is a product necessarily generated from a steel-refining process. Slag is necessarily produced from the gangue of iron ore or coke during an iron-making process, and is necessarily produced from the oxide formed by the oxidization and deoxidization of molten iron or molten steel or the auxiliary material added for the purpose of refining during a steel-making process.

As a related art, Korean Patent Application Publication No. 10-1999-0018912 (Publication date: Mar. 15, 1999) discloses a method of recycling reduced slag.

SUMMARY

An object of the present invention is to provide a method of reducing slag, wherein an optimal reducing agent is supplied into slag generated from an iron-making or steel-making process to improve the reduction effect of slag, thereby increasing the recovery amount of valuable metals in the slag.

In order to accomplish the above object, an aspect of the present invention provides a method of reducing slag, including the steps of: examining the components of slag to be reduced, and setting a target composition ratio after reduction; determining the mixing ratio and input amount of a complex reducing agent of a plurality of reducing agents in accordance with the set target composition ratio to determine the complex reducing agent; and supplying the complex reducing agent into molten slag to reduce the slag.

The method of reducing slag according to the present invention is advantageous in that two or more kinds of complex reducing agents are used, and the optimal mixing ratio and input amount thereof in accordance with the corresponding slag are calculated and used, thus maximizing the reduction effect of slag and efficiently utilizing various kinds of reducing agents.

Further, the method of reducing slag according to the present invention is advantageous in that the recovery amount of valuable metals in the slag is increased, and various kinds of reducing agents are efficiently utilized in reducing the slag, thus reducing cost.

DESCRIPTION OF THE REFERENCE NUMERALS IN THE DRAWINGS

S100: step of setting target composition ratio
S200: step of determining complex reducing agent
S300: step of reducing slag
S210: step of determining mixing ratio
S220: step of calculating input amount
S230: step of calculating reaction product
S240: step of calculating slag composition
S250: step of comparing composition ratio
S260: step of determining reducing agent

DETAILED DESCRIPTION

Hereinafter, preferred embodiments of the present invention will be described in detail with reference to the accompanying drawings.

Figure 1:
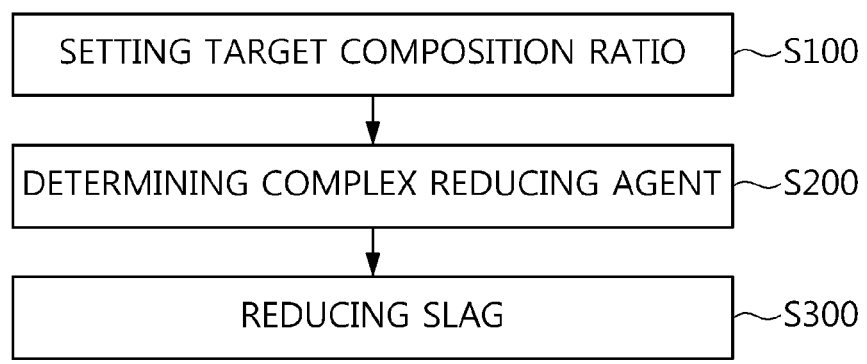
FIG. 1 is a block diagram showing a method of reducing slag according to the present invention.

Referring to FIG. 1, the method of reducing slag according to the present invention includes the step (S100) of examining the components of slag to be reduced, and setting target composition ratio after reduction.

The slag used in the present invention is steel-making slag generated by scrap melting in an electric furnace, and has a composition ratio given in Table 1 below.

TABLE 1

| | Components | | | | | | |
| --- | --- | --- | --- | --- | --- | --- | --- |
| | FeO | MnO | $SiO_2$ | $Al_2O_3$ | MgO | CaO | Others |
| Composition ratio (wt %) | 19~32.5 | 5~10 | 18.5~26 | 8.5~16 | 6.0~12 | 14~26 | 0.1~2 |

The other components in the slag may be $P_2O_5$, S, $FeO_3$, $CrO_3$ and $TiO_2$, and the slag may include at least one of $P_2O_5$, S, $FeO_3$, $CrO_3$ and $TiO_2$.

After the step (S100) of setting the target composition ratio, the mixing ratio and input amount of a complex reducing agent of a plurality of reducing agents are determined based on the set target composition ratio to determine the complex reducing agent (S200), and then the determined complex reducing agent is supplied into molten slag to reduce the slag (S300).

Slag is necessarily produced from an iron-making process and a steel-making process, and the main slag components to be reduced may be FeO, $Fe_2O_3$, MnO and $P_2O_5$. The elements of a reducing agent for reducing the slag may be calcium (Ca), aluminum (Al), silicon dioxide (Si), carbon (C), etc. Examples of typical reducing agents may include metal aluminum (Al), CaSi-30, FeSi, SiC, graphite and the like.

Figure 2:
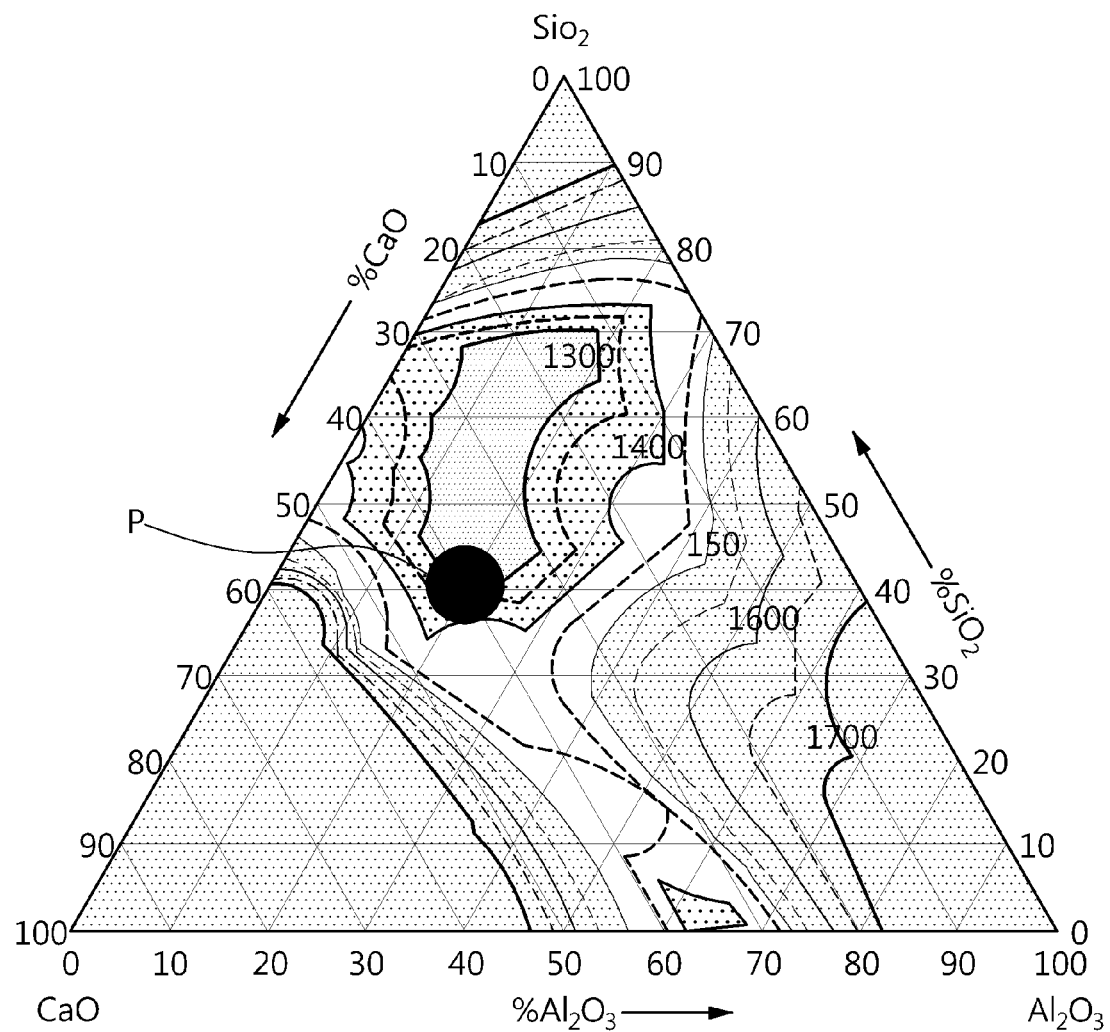
FIG. 2 is a graph showing the melting points of slag according to the components thereof, wherein the melting points thereof are used in setting a target composition ratio.

The main slag components exerting an influence on reduction may be calcium oxide (CaO), silicon dioxide ($SiO_2$), and aluminum oxide ($Al_2O_3$). FIG. 2 is a graph showing the melting points of slag according to the component ratios of calcium oxide (CaO), silicon dioxide ($SiO_2$) and $Al_2O_3$ in the slag. Viscosity lines may be expressed in the graph although they are not shown in FIG. 2. In the reduction reaction of slag, the melting point and viscosity of slag are important factors. Calcium oxide (CaO), silicon dioxide ($SiO_2$) and aluminum oxide ($Al_2O_3$), which are the main components of slag, have an influence on the melting point and viscosity of the slag.

In FIG. 2, the optimal composition ratio of calcium oxide (CaO), silicon dioxide ($SiO_2$) and aluminum oxide ($Al_2O_3$) in the slag may be indicated as the target point P. The target point P may be indicated in a plural number, and is a target composition ratio after reduction.

In the step (S100) of setting the target composition ratio, the current component ratios of calcium oxide (CaO), silicon dioxide ($SiO_2$) and aluminum oxide ($Al_2O_3$) in the slag are examined, and the most approximate component ratio of the current components ratios thereof is set as the corresponding target composition ratio.

The target composition ratio may be set to 39.5 to 40.5 wt % of calcium oxide (CaO), 39.5 to 40.5 wt % of silicon dioxide ($SiO_2$) and 19.5 to 20.5 wt % of aluminum oxide ($Al_2O_3$), when the total amount of calcium oxide (CaO), silicon dioxide ($SiO_2$) and aluminum oxide ($Al_2O_3$) in the reacted slag after the supply of a reducing agent is set to 100 wt %. From FIG. 2, it can be ascertained that the viscosity and melting point of slag are lowest at the target point P.

In order to accelerate the phase separation between reduced metal and slag, slag must be maintained in a molten state, and its melting point must be lower than a working temperature. At the target point p, the viscosity and melting point is lowest, and the reduction efficiency of the reduced metal is highest.

Figure 3:
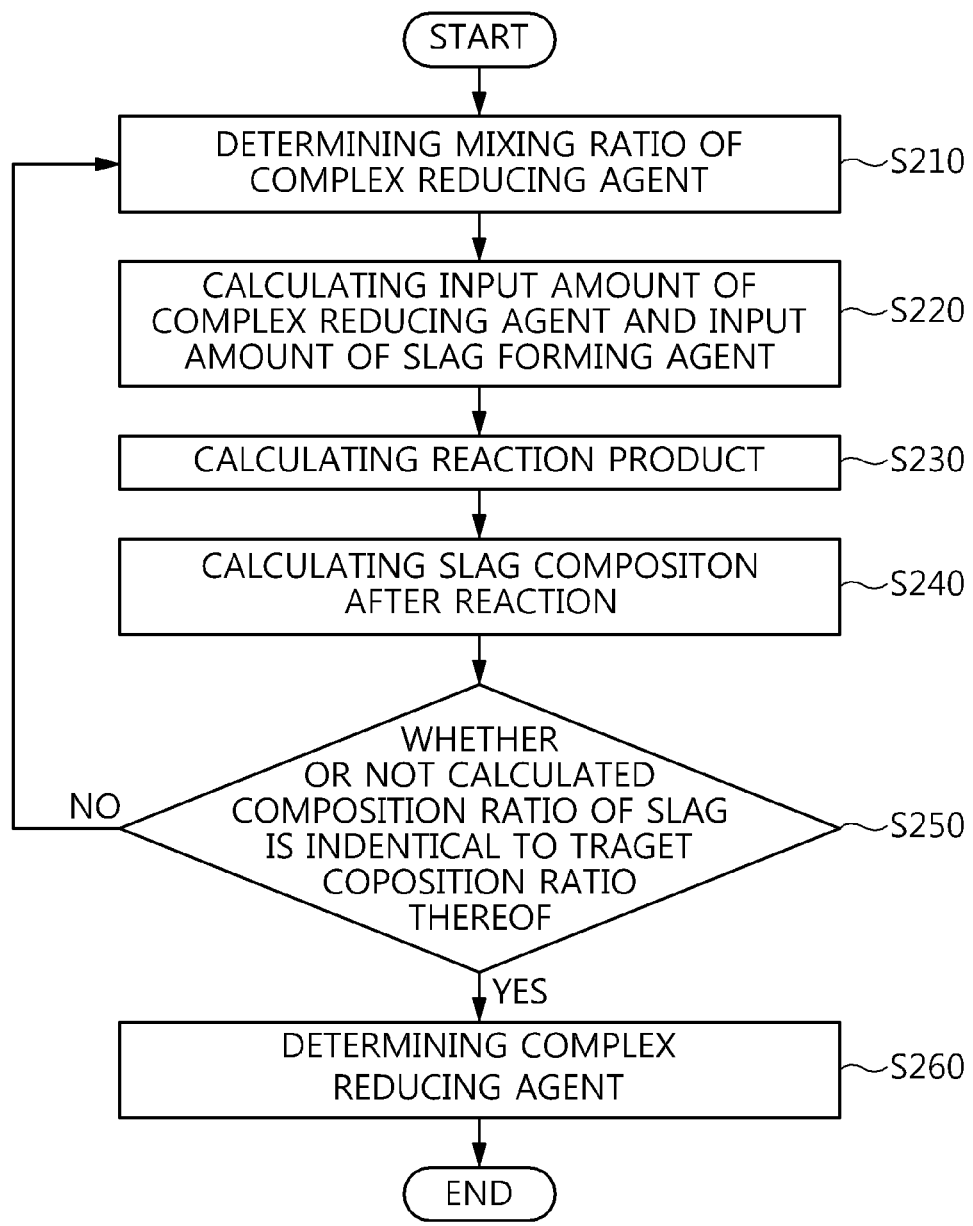
FIG. 3 is a flowchart showing the step of determining a complex reducing agent according to the present invention.

Meanwhile, referring to FIG. 3, the step (S200) of determining the complex reducing agent includes the steps of: (S210) determining the mixing ratio of the plurality of complex reducing agents and the mixing ratio of the reducing agents in a particular complex reducing agent; (S220) calculating the input amount of the particular complex reducing agent and the input amount of a slag forming agent based on an amount of slag to be reduced; (S230) calculating a reaction product obtained by a reaction of the slag with the particular complex reducing agent after the supply of the particular complex reducing agent; (S240) calculating the composition of the slag changed by the reaction product; (S250) comparing the calculated composition of the slag with the target composition ratio to determine the mixing ratio of the particular complex reducing agent when the calculated composition of the slag and the target composition ration are different; and (S260) determining a corresponding complex reducing agent as a final reducing agent when the calculated composition of the slag and the target composition ratio are substantially the same.

The step (S210) of determining the mixing ratio thereof will be described as follows by using two industrial reducing agents (A and B).

The mixing ratio ($R_{mix}$) of the reducing agent A is defined by the following Equation 1:

$$R_{mix} = \frac{W_A}{W_A + W_B} \times 100 \qquad \text{[Equation 1]}$$

$W_A$: weight (g) of reducing agent A
$W_B$: weight (g) of reducing agent B.

The weight ($W_B$) of the reducing agent B is defined by the following Equation 2, based on Equation 1 above:

$$W_B = \left(\frac{W_A}{R_{mix}} - 1\right) \times 100. \qquad \text{[Equation 2]}$$

The content of specific element or oxide (M) in a complex reducing agent, in which two industrial reducing agents (A and B) are mixed, is defined by the following Equation 3:

$$\% M = \frac{W_A \times \frac{\langle \% M \rangle_A}{100} + W_B \times \frac{\langle \% M \rangle_B}{100}}{W_A + W_B} \times 100 \qquad \text{[Equation 3]}$$
$$= \frac{W_A \times \langle \% M \rangle_A + W_B \times \langle \% M \rangle_B}{W_A + W_B}$$

% M: average content (wt %) of component M in complex reducing agent
% $M_A$: content (wt %) of component M in reducing agent A
% $M_B$: content (wt %) of component M in complex reducing agent B.

The average content of component M included in the complex reducing agent is calculated by the following Equation 4 based on the relationship between Equation 3 and Equation 2 above.

Here, the component M may be Ca, Al, Si or C, which is a reducing component in the reducing agent.

$$\% M = \langle \% M \rangle_A \cdot \left(\frac{R_{mix}}{100}\right) + \langle \% M \rangle_B \cdot \left(1 - \frac{R_{mix}}{100}\right). \qquad \text{[Equation 4]}$$

The average concentration of component M contained in the two kinds of industrial reducing agents A and B is calculated by the mixing ratio of component A and reducing agent.

In the step (S220) of calculating the input amounts thereof, the input amount of the complex reducing agent and the input amount of the slag forming agent are determined in accordance with the amount of slag to be reduced. In this case, first, input amount determination index K is calculated.

The input amount determination index K is calculated by the following Equation 5, based on the content (wt %) of calcium (Ca), aluminum (Al), silicon (Si) or carbon (C) in the complex reducing agent.

$$K = \frac{\% Ca}{M_{Ca}} + \frac{\% Al}{2/3 \times M_{Al}} + \frac{\% Si}{1/2 \times M_{Si}} + \frac{\% C}{M_C} \qquad \text{[Equation 5]}$$

$M_{Ca}$: atomic weight (g/mole) of calcium (Ca)
$M_{Al}$: atomic weight (g/mole) of aluminum (Al)
$M_{Si}$: atomic weight (g/mole) of silicon (Si)
$M_C$: atomic weight (g/mole) of carbon (C)
% Ca: content (wt %) of Ca in complex reducing agent
% Al: content (wt %) of Al in complex reducing agent
% Si: content (wt %) of Si in complex reducing agent
% C: content (wt %) of C in complex reducing agent.

The input amount ($W_{red}$) of the reducing agent is represented by the following Equation 6 using the above input amount determination index K:

$$W_{red} = \frac{100}{K} \cdot (1 + N_{(MnO)} + 5 \cdot N(P_2O_0)) \quad \text{[Equation 6]}$$

MnO is included in an amount of N mole based on 1 mole of iron oxide (FeO), and $P_2O_5$ is included in an amount of N mole based on 1 mole of FeO.

Meanwhile, lime (CaO) is used as the slag forming agent, and the input amount of the lime (CaO) is represented by the following Equation 7:

$$W_{B.Lime} = \alpha \cdot \left( M_{C2O} + \frac{\langle\% \text{ SiO}_2\rangle \cdot M_{CaO}}{\langle\% \text{ CaO}\rangle \cdot M_{SiO_2}} + M_{SiO_2} + \frac{\langle\% \text{ Al}_2\text{O}_3\rangle \cdot M_{CaO}}{\langle\% \text{ CaO}\rangle \cdot M_{Al2O3}} \cdot M_{Al2O3} \right) = \alpha \cdot M_{CaO} \cdot \frac{100}{\langle\% \text{ CaO}\rangle} \quad \text{[Equation 7]}$$

$M_{CaO}$: atomic weight (g/mole) of CaO
$M_{SiO_2}$: atomic weight (g/mole) of $SiO_2$
$M_{Al2O3}$: atomic weight (g/mole) of $Al_2O_3$%
% CaO: content (wt %) of CaO in lime
% $Al_2O_3$: content (wt %) of $Al_2O_3$ in lime
% $SiO_2$: content (wt %) of $SiO_2$ in lime.

The following Equations 8 to 10 are steps for calculating Equation 7 above.

The above a is referred to as the required amount (a mole) of lime per 1 mole of FeO, and is represented by the following Equation 8.

$$\alpha = P/R \quad \text{[Equation 8]}$$

The above P is represented by the following Equation 9.

$$P = \frac{(1 + N_{(MnO)} + 5 \cdot N_{(P_2O_2)})}{K} \cdot \left\{ \frac{\% \text{ Si}}{M_{Si}} \cdot M_{SiO_2} + \% \text{ SiO}_2 + \frac{\% \text{ Al}}{2 \cdot M_{Al}} \cdot M_{Al_2O_2} + \% \text{ Al}_2\text{O}_3 \right) - \left( \frac{100 - (\% \text{ CaO})}{(\% \text{ CaO})} \right) \cdot \left( \frac{\% \text{ Ca}}{M_{C2}} \right) \right\} + N_{(Al_2O_2)} \cdot Al_2O_3 + N_{(SiO_2)} \cdot SiO_2 - \left( \frac{100 - (\% \text{ CaO})}{(\% \text{ CaO})} \right) \cdot N_{CaO} + M_{CaO} \quad \text{[Equation 9]}$$

The above R is represented by the following Equation 10.

$$P = M_{CaO} \cdot \left( \frac{100 - (\% \text{ CaO})}{(\% \text{ CaO})} \right) - \left( \frac{M_{C2O}}{\langle\% \text{ CaO}\rangle} \right) \cdot (\langle\% \text{ SiO}_2\rangle + \langle\% \text{ Al}_2\text{O}_3\rangle)$$

$$= M_{CaO} \cdot \left\{ \left( \frac{100 - (\% \text{ CaO})}{(\% \text{ CaO})} \right) - \left( \frac{100 - (\% \text{ CaO})}{(\% \text{ CaO})} \right) \right\}$$

$$= 100 \cdot M_{CaO} \cdot \left( \frac{1}{(\% \text{ CaO})} - \frac{1}{(\% \text{ CaO})} \right) \quad \text{[Equation 10]}$$

N mole of $Al_2O_3$ is used per 1 mole of FeO, and N mole of $SiO_2$ is used per 1 mole of FeO.

The step (S230) of calculating the reaction product is represented by the following Equations 11 to 13. Here, the weights (g) of CaO, $SiO_2$ and $Al_2O_3$ influencing the reduction of slag are calculated, respectively.

$$W_{CaO} = \frac{(1 + N_{(MnO)} + 5 \cdot M_{P_2O_0})}{K} \cdot \left( \frac{\% \text{ Ca}}{M_{Ca}} \cdot M_{CaO} \right) + N_{(CaO)} \cdot M_{CaO} + \alpha \cdot M_{CaO} \quad \text{[Equation 11]}$$

$$W_{SiO2} = \frac{(1 + N_{(MnO)} + 5 \cdot M_{(P_2O_0)})}{K} \cdot \left( \frac{\% \text{ Si}}{M_{Si}} \cdot M_{SiO_2} + \% \text{ SiO}_2 \right) + N_{(SiO_2)} \cdot M_{(SiO_2)} + \alpha \cdot \frac{\langle\% \text{ SiO}_2\rangle}{\langle\% \text{ CaO}\rangle} \cdot M_{(SiO_2)} \quad \text{[Equation 12]}$$

$$W_{Al2O3} = \frac{(1 + N_{(MnO)} + 5 \cdot M_{(P_2O_0)})}{K} \cdot \left( \frac{\% \text{ Al}}{2 \cdot M_{Al}} \cdot M_{Al_2O_3} + \% \text{ Al}_2\text{O}_3 \right) + N_{(Al_2O_3)} \cdot M_{(Al_2O_3)} + \alpha \cdot \left( \frac{\langle\% \text{ Al}_2\text{O}_3\rangle}{\langle\% \text{ CaO}\rangle} \cdot M_{(CaO)} \right) \quad \text{[Equation 13]}$$

Further, the step (S240) of calculating the composition of slag after reaction is represented by the following Equations 14 to 16. Here, the weights (g) of CaO, $SiO_2$ and $Al_2O_3$, which are respectively calculated in the step (S230), are used.

$$(\% \text{ CaO}) = \frac{W_{CaO}}{W_{CaO} + W_{SiO_2} + W_{Al_2O_3}} \times 100 \quad \text{[Equation 14]}$$

$$(\% \text{ SiO}_2) = \frac{W_{SiO_2}}{W_{CaO} + W_{SiO_2} + W_{AlO}} \times 100 \quad \text{[Equation 15]}$$

$$(\% \text{ Al}_2\text{O}_3) = \frac{W_{Al_2O_3}}{W_{CaO} + W_{SiO_2} + W_{Al_2O_3}} \times 100 \quad \text{[Equation 16]}$$

For reference, the general reduction reaction formula of slag including a complex reducing agent and a slag forming agent is represented by the following Reaction Formula 1:

$$\{(FeO + N_{(MnO)} \times MnO + N_{(P_2O_5)} \times P_2O_5)\} + \quad \text{[Reaction Formula 1]}$$

$$\{(N_{(CaO)} \times CaO + N_{(MgO)} \times MgO + N_{(Al_2O_3)} \times Al_2O_3 + N_{(SiO_2)} \times SiO_2)\} +$$

$$\frac{(1 + N_{(MnO)} + 5 \times N_{(P_2O_5)})}{K} \times$$

$$\left\{ \left( \frac{\% \text{ Ca}}{M_{Ca}} \times Ca + \frac{\% \text{ Al}}{M_{Al}} \times Al + \frac{\% \text{ Si}}{M_{Si}} \times Si + \frac{\% \text{ C}}{M_C} \times C \right) + \left\{ \left( \frac{\% \text{ SiO}_2}{M_{SiO_2}} \times SiO_2 + \frac{\% \text{ Al}_2\text{O}_3}{M_{Al_2O_3}} \times SiO_2 + \frac{\% \text{ Fe}}{M_{Fe}} \times Fe \right) \right\} + 
$$

$$\alpha \times (CaO + n_{SiO_2} \times SiO_2 + n_{Al_2O_3} \times Al_2O_3) +$$

$$\frac{(1 + N_{(MnO)} + 5 \times N_{(P_2O_5)})}{K} \times$$

$$\left\{ \left( \frac{\% \text{ Ca}}{M_{Ca}} \times CaO + \frac{\% \text{ Al}}{2 \times M_{Al}} \times Al_2O_3 + \frac{\% \text{ Si}}{M_{Si}} \times SiO_2 + \frac{\% \text{ C}}{M_C} \times CO \right) + \right.$$

$$\left\{ \left( \frac{\% \text{ SiO}_2}{M_{SiO_2}} \times SiO_2 + \frac{\% \text{ Al}_2\text{O}_3}{M_{Al_2O_3}} \times Al_2O_3 + \frac{\% \text{ Fe}}{M_{Fe}} \right) \right\} +$$

-continued

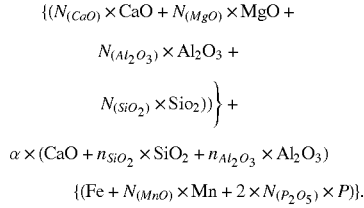
$$\{(N_{(CaO)} \times CaO + N_{(MgO)} \times MgO +$$
$$N_{(Al_2O_3)} \times Al_2O_3 +$$
$$N_{(SiO_2)} \times SiO_2))\} +$$
$$\alpha \times (CaO + n_{SiO_2} \times SiO_2 + n_{Al_2O_3} \times Al_2O_3)$$
$$\{(Fe + N_{(MnO)} \times Mn + 2 \times N_{(P_2O_5)} \times P)\}.$$

In the step (S250) of comparing the composition ratio, the above-calculated composition ratio of calcium oxide (CaO), silicon dioxide (SiO₂) and aluminum oxide (Al₂O₃) is compared with the target composition ratio of slag.

In this case, when the above-calculated composition ratio of calcium oxide (CaO), silicon dioxide (SiO₂) and aluminum oxide (Al₂O₃) is identical to the target composition ratio of slag, a final reducing agent is determined in the step (S260) of determining the reducing agent. Further, when the above-calculated composition ratio of calcium oxide (CaO), silicon dioxide (SiO₂) and aluminum oxide (Al₂O₃) is different from the target composition ratio of slag, the step (S210) of determining the mixing ratio, the step (S220) of calculating the inputs of the reducing agent and the slag forming agent, the step (S230) of calculating the reaction product, the step (S240) of calculating the composition of slag and the step (S250) of comparing the composition ratio are repeated.

In the present invention, in the step of determining the complex reducing agent, the complex reducing agent is determined such that it has the above target composition ratio, that is, a composition ratio of 39.5 to 40.5 wt % of calcium oxide (CaO), 39.5 to 40.5 wt % of silicon dioxide (SiO₂) and 19.5 to 20.5 wt % of aluminum oxide (Al₂O₃), when the total amount of calcium oxide (CaO), silicon dioxide (SiO₂) and aluminum oxide (Al₂O₃).

in the slag reacted after the supply of the reducing agent is set to 100 wt %. Further, in the step of determining the complex reducing agent, the component ratio is determined such that the content ratio of magnesium oxide (MgO) in the reacted slag after the supply of the complex reducing agent is set to a predetermined value, and the complex reducing agent is determined such that it has a composition ratio of 39.5 to 40.5 wt % of calcium oxide (CaO), 39.5 to 40.5 wt % of silicon dioxide (SiO₂) and 19.5 to 20.5 wt % of aluminum oxide (Al₂O₃), when the total amount of calcium oxide (CaO), silicon dioxide (SiO₂) and aluminum oxide (Al₂O₃) in the slag is set to 100 wt %. For example, magnesium oxide (MgO) is fixed such that its composition ratio in the slag after the supply of the reducing agent is 7 wt %. The reason for this is that magnesium oxide (MgO) influences the viscosity and melting point of slag. Further, the component ratio of magnesium oxide (MgO) after the supply of the reducing agent may be predetermined based on the total weight of calcium oxide (CaO), silicon dioxide (SiO₂) and aluminum oxide (Al₂O₃). That is, the component ratio of magnesium oxide (MgO) is set within the predetermined range. For example, the target composition ratio is determined when the component ratio of magnesium oxide (MgO) with respect to the total weight (100 wt %) of calcium oxide (CaO), silicon dioxide (SiO₂) and aluminum oxide (Al₂O₃) is 100 wt %. In this case, it is preferred that the target composition ratio be a composition ratio of calcium oxide (CaO) 40 wt %, silicon dioxide (SiO₂) 40 wt %, aluminum oxide (Al₂O₃) 20 wt % when the component ratio of magnesium oxide (MgO) is 10 wt % based on the total weight (100 wt %) of calcium oxide (CaO), silicon dioxide (SiO₂) and aluminum oxide (Al₂O₃).

Preferably, the complex reducing agent determined in the step of determining the complex reducing agent may include aluminum (Al), calcium (Ca), silicon (Si), carbon (C), and iron (Fe).

The complex reducing agent is determined such that it has a composition ratio of 7.5 to 37 wt %, 19.5 to 28.5 wt % of calcium (Ca), 37 to 55.5 wt % of Si, 0.2 to 0.4 wt % of C and 6.3 to 9.8 wt % of iron (Fe), when the total amount of aluminum (Al), calcium (Ca), silicon (Si), carbon (C), and iron (Fe) in the complex reducing agent is set to 100 wt %.

Further, in the step of determining the complex reducing agent, the input of a slag forming agent based on the total weight of the complex reducing agent is determined, and lime (calcium oxide) is used as the slag forming agent.

The lime may be supplied in an amount of 20-64 wt % based on the total weight (100 wt %) of the complex reducing agent.

Examples of the present invention are as follows. It is ascertained from these Examples that the target composition ratio of slag is satisfied by the composition and range of the complex reducing agent of the present invention.

The composition of slag according to each Example is given in Table 2 below.

TABLE 2

|  | FeO (wt %) | MnO (wt %) | SiO₂ (wt %) | Al₂O₃ (wt %) | MgO (wt %) | CaO (wt %) | P₂O₅ (wt %) | S (wt %) | Others (wt %) |
|---|---|---|---|---|---|---|---|---|---|
| Ex. 1 | 20.6 | 6 | 25 | 15 | 7 | 25 | 0.1 | 0.4 | 0.9 |
| Ex. 2 | 21.9 | 6 | 25 | 15 | 7 | 24 | 0.1 | 0.4 | 0.6 |
| Ex. 3 | 23.1 | 6 | 24 | 15 | 7 | 24 | 0.1 | 0.4 | 0.4 |
| Ex. 4 | 24.4 | 6 | 24 | 15 | 7 | 23 | 0.1 | 0.4 | 0.1 |
| Ex. 5 | 25.7 | 6 | 25 | 10 | 7 | 25 | 0.1 | 0.4 | 0.8 |
| Ex. 6 | 27 | 6 | 25 | 10 | 7 | 24 | 0.1 | 0.4 | 0.5 |
| Ex. 7 | 28.3 | 6 | 23 | 15 | 7 | 20 | 0.1 | 0.4 | 0.2 |
| Ex. 8 | 29.6 | 7 | 25 | 10 | 7 | 20 | 0.1 | 0.4 | 0.9 |
| Ex. 9 | 30.9 | 6 | 25 | 10 | 7 | 20 | 0.1 | 0.4 | 0.6 |
| Ex. 10 | 32.2 | 6 | 20 | 10 | 7 | 24 | 0.1 | 0.4 | 0.3 |
| Ex. 11 | 32.2 | 6 | 22 | 10 | 7 | 22 | 0.1 | 0.4 | 0.3 |
| Ex. 12 | 32.2 | 7 | 25 | 13 | 7 | 15 | 0.1 | 0.4 | 0.3 |
| Ex. 13 | 32.2 | 7 | 22 | 15 | 7 | 15 | 0.1 | 0.4 | 1.3 |
| Ex. 14 | 19.3 | 5 | 25 | 15 | 10 | 25 | 0.1 | 0.4 | 0.2 |
| Ex. 15 | 19.3 | 10 | 24 | 15 | 7 | 24 | 0.1 | 0.4 | 0.2 |
| Ex. 16 | 19.3 | 5 | 24 | 15 | 12 | 24 | 0.1 | 0.4 | 0.2 |
| Ex. 17 | 32.2 | 5 | 20 | 10 | 12 | 50 | 0.1 | 0.4 | 0.3 |
| Ex. 18 | 32.2 | 10 | 21 | 10 | 6 | 20 | 0.1 | 0.4 | 0.3 |

TABLE 2-continued

|  | FeO (wt %) | MnO (wt %) | SiO$_2$ (wt %) | Al$_2$O$_3$ (wt %) | MgO (wt %) | CaO (wt %) | P$_2$O$_5$ (wt %) | S (wt %) | Others (wt %) |
|---|---|---|---|---|---|---|---|---|---|
| Ex. 19 | 28.3 | 5 | 20 | 14 | 12 | 20 | 0.1 | 0.4 | 0.2 |
| Ex. 20 | 28.3 | 10 | 20 | 14 | 7 | 20 | 0.1 | 0.4 | 0.2 |

It can be ascertained from Table 3 below that the content ratio of MgO in the slag of each Example reacted after the supply of the complex reducing agent is fixed at the predetermined value, and simultaneously the content ratio of calcium oxide (CaO), silicon dioxide (SiO$_2$) and aluminum oxide (Al$_2$O$_3$) is identical to the above target composition ratio.

That is, in the step of determining the complex reducing agent, the input and component ratio of the complex reducing agent is determined that the content ratio of magnesium oxide (MgO) in the slag reacted after the supply of the complex reducing agent is fixed at the predetermined value, and simultaneously the content ratio of calcium oxide (CaO), silicon dioxide (SiO$_2$) and aluminum oxide (Al$_2$O$_3$) is identical to the above target composition ratio.

The composition of slag is the component ratio of calcium oxide (CaO), silicon dioxide (SiO$_2$) and aluminum oxide (Al$_2$O$_3$) when the total amount of calcium oxide (CaO), silicon dioxide (SiO$_2$) and aluminum oxide (Al$_2$O$_3$) after the reaction of the slag with the complex reducing agent is set to 100 wt %.

Further, the composition of the complex reducing agent, given in Table 3 below, is the component ratio of aluminum (Al), calcium (Ca), silicon (Si), carbon (C), and iron (Fe) when the total amount of aluminum (Al), calcium (Ca), silicon (Si), carbon (C), and iron (Fe) is set to 100 wt %.

Further, the component ratio of magnesium oxide (MgO) in the slag composition given in Table 3 below is fixed such that magnesium oxide (MgO) is included in an amount of 10 wt % based on the total amount (100 wt %) of calcium oxide (CaO), silicon dioxide (SiO$_2$) and aluminum oxide (Al$_2$O$_3$).

TABLE 3

|  | Composition of reducing agent (wt %) | | | | | Lime | Composition of slag (wt %) | | |
|---|---|---|---|---|---|---|---|---|---|
|  | Al | Ca | Si | C | Fe | % B. lime | CaO | SiO$_2$ | Al$_2$O$_3$ |
| Ex. 1 | 11.46 | 26.89 | 52.02 | 0.37 | 9.26 | 44.6 | 40.01 | 39.99 | 20.00 |
| Ex. 2 | 12.06 | 26.70 | 51.67 | 0.37 | 9.20 | 48.5 | 40.02 | 39.98 | 20.00 |
| Ex. 3 | 10.16 | 27.29 | 52.78 | 0.38 | 9.39 | 44.8 | 39.99 | 40.01 | 20.00 |
| Ex. 4 | 10.76 | 27.10 | 52.43 | 0.38 | 9.33 | 48.4 | 40.00 | 40.00 | 20.00 |
| Ex. 5 | 36.40 | 19.31 | 37.37 | 0.27 | 6.65 | 36.6 | 40.01 | 39.99 | 20.00 |
| Ex. 6 | 35.90 | 19.47 | 37.66 | 0.27 | 6.70 | 41.2 | 40.00 | 40.00 | 20.00 |
| Ex. 7 | 10.21 | 27.27 | 52.75 | 0.38 | 9.39 | 53.6 | 40.00 | 40.00 | 20.00 |
| Ex. 8 | 34.73 | 19.82 | 38.35 | 0.28 | 6.82 | 53.3 | 40.00 | 40.00 | 20.00 |
| Ex. 9 | 34.66 | 19.85 | 38.39 | 0.27 | 6.83 | 53.2 | 40.00 | 40.00 | 20.00 |
| Ex. 10 | 24.92 | 22.80 | 44.11 | 0.32 | 7.85 | 21.0 | 40.01 | 39.99 | 20.00 |
| Ex. 11 | 28.66 | 21.67 | 41.91 | 0.30 | 7.46 | 39.4 | 40.01 | 39.99 | 20.00 |
| Ex. 12 | 22.78 | 23.45 | 45.37 | 0.33 | 8.07 | 63.1 | 40.00 | 40.00 | 20.00 |
| Ex. 13 | 10.11 | 27.30 | 52.81 | 0.38 | 9.40 | 60.2 | 40.00 | 40.00 | 20.00 |
| Ex. 14 | 10.21 | 27.27 | 52.75 | 0.38 | 9.39 | 44.9 | 40.00 | 40.00 | 20.00 |
| Ex. 15 | 10.27 | 27.25 | 52.72 | 0.38 | 9.38 | 44.9 | 40.00 | 40.00 | 20.00 |
| Ex. 16 | 7.35 | 28.14 | 54.43 | 0.39 | 9.69 | 45.7 | 40.00 | 40.00 | 20.00 |
| Ex. 17 | 24.82 | 22.83 | 44.18 | 0.31 | 7.86 | 40.5 | 40.00 | 40.00 | 20.00 |
| Ex. 18 | 26.53 | 22.32 | 43.16 | 0.31 | 7.68 | 43.2 | 40.00 | 40.00 | 20.00 |
| Ex. 19 | 7.75 | 28.02 | 54.19 | 0.39 | 9.65 | 45.6 | 40.00 | 40.00 | 20.00 |
| Ex. 20 | 9.94 | 27.35 | 52.91 | 0.38 | 9.42 | 45.0 | 40.00 | 40.00 | 20.00 |

It can be ascertained from Table 3 that the complex reducing agent of the present invention can improve and maximize the reduction effect of slag by reacting the slag at the target composition ratio.

Meanwhile, in the method of reducing slag according to the present invention, the complex reducing agent determined in the step (S200) of determining the complex reducing agent is introduced into slag to reduce the slag in the step (S300) of reducing the slag.

The method of reducing slag according to the present invention is advantageous in that two or more kinds of complex reducing agents are used, and the optimal mixing ratio and input thereof in accordance with the corresponding slag are calculated and used, thus maximizing the reduction effect of slag and efficiently utilizing various kinds of reducing agents.

Further, the method of reducing slag according to the present invention is advantageous in that the recovery amount of organic metal in slag is increased, and various kinds of reducing agents are efficiently utilized in reducing slag, thus reducing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of reducing slag generated by scrap melting in an electric furnace, comprising:
    examining components of slag to be reduced, and setting a target composition ratio after reduction;
    determining a mixing ratio and an input amount of a complex reducing agent of a plurality of reducing agents based on the set target composition ratio; and
    supplying the complex reducing agent into molten slag to reduce the slag,
    wherein the determining a mixing ratio and an input amount includes:
    determining the mixing ratio of a plurality of complex reducing agents and the mixing ratio of the reducing agents in a particular complex reducing agent;
    calculating the input amount of the particular complex reducing agent and an input amount of a slag forming agent based on an amount of slag to be reduced;
    calculating a reaction product obtained by a reaction of the slag with the particular complex reducing agent after supplying the particular complex reducing agent;
    calculating a composition of the slag changed by the reaction product;
    comparing the composition of the slag with the target composition ratio to determine the mixing ratio of the particular complex reducing agent when the composition of the slag and the target composition ratio are different; and
    determining a corresponding complex reducing agent as a final reducing agent when the composition of the slag and the target composition ratio are substantially the same,
    wherein, in setting the target composition ratio after reduction, the target composition ratio is set to about 39.5 to 40.5 wt % of calcium oxide (CaO), about 39.5 to 40.5 wt % of silicon dioxide ($SiO_2$) and about 19.5 to 20.5 wt % of aluminum oxide ($Al_2O_3$), when the total amount of calcium oxide (CaO), silicon dioxide ($SiO_2$) and aluminum oxide ($Al_2O_3$) in the slag is set to 100 wt %,
    wherein, in the determining of the complex reducing agent, the complex reducing agent includes aluminum (Al), calcium (Ca), silicon (Si), carbon (C), and iron (Fe).

2. The method of claim 1, wherein, in the setting of the target composition ratio, the slag having the target composition ratio includes calcium oxide (CaO), silicon dioxide ($SiO_2$) and aluminum oxide ($Al_2O_3$) as components.

3. The method of claim 1, wherein, in the calculating of the reaction product, the weights (g) of calcium oxide (CaO), silicon dioxide ($SiO_2$) and aluminum oxide ($Al_2O_3$) in the slag are calculated, and in the calculating the of composition of the slag, the contents (wt %) of calcium oxide (CaO), silicon dioxide ($SiO_2$) and aluminum oxide ($Al_2O_3$) in the reduced slag are calculated.

4. The method of claim 1, wherein, in the determining of the particular complex reducing agent, in the component ratio of the complex reducing agent, the content ratio of magnesium oxide (MgO) in the reacted slag after the supply of the particular complex reducing agent is set to a predetermined value.

5. The method of claim 4, wherein the complex reducing agent is determined to have a composition ratio of about 7.5 to 37 wt % of aluminum (Al), about 19.5 to 28.5 wt % of calcium (Ca), about 37 to 55.5 wt % of silicon (Si), about 0.2 to 0.4 wt % of carbon (C) and about 6.3 to 9.8 wt % of iron (Fe), when the total amount of aluminum (Al), calcium (Ca), silicon (Si), carbon (C), and iron (Fe) in the complex reducing agent is set to 100 wt %.

6. The method of claim 5, wherein, in the determining of the particular complex reducing agent, the input of an slag forming agent based on the total weight of the complex reducing agent is determined, lime (calcium oxide) is used as the slag forming agent, and the lime is supplied in an amount of about 20~64 wt % based on the total weight (100 wt %) of the particular complex reducing agent.

* * * * *